(12) United States Patent
Mořkovský

(10) Patent No.: US 10,200,391 B2
(45) Date of Patent: Feb. 5, 2019

(54) DETECTION OF MALWARE IN DERIVED PATTERN SPACE

(71) Applicant: Avast Software s.r.o., Prague (CZ)

(72) Inventor: Libor Mořkovský, Křemže (CZ)

(73) Assignee: AVAST SOFTWARE S.R.O., Prague (CZ)

( * ) Notice: Subject to any disclaimer, the term of this patent is extended or adjusted under 35 U.S.C. 154(b) by 224 days.

(21) Appl. No.: 15/275,039

(22) Filed: Sep. 23, 2016

(65) Prior Publication Data

US 2017/0085585 A1    Mar. 23, 2017

Related U.S. Application Data

(60) Provisional application No. 62/222,634, filed on Sep. 23, 2015.

(51) Int. Cl.
*H04L 29/06* (2006.01)

(52) U.S. Cl.
CPC ...... *H04L 63/1425* (2013.01); *H04L 63/0227* (2013.01); *H04L 63/145* (2013.01); *H04L 63/1416* (2013.01)

(58) Field of Classification Search
CPC ............. H04L 63/1425; H04L 63/0227; H04L 63/1416; H04L 63/145
USPC .......................................................... 726/23
See application file for complete search history.

(56) References Cited

U.S. PATENT DOCUMENTS

| | | | |
|---|---|---|---|
| 8,069,484 B2 | 11/2011 | McMillan et al. | |
| 8,302,193 B1 * | 10/2012 | Gardner | G06F 21/57 707/758 |
| 8,353,040 B2 | 1/2013 | Tahan et al. | |
| 8,732,825 B2 | 5/2014 | Park et al. | |
| 9,129,110 B1 * | 9/2015 | Mason | G06F 21/564 |
| 9,838,418 B1 * | 12/2017 | Wardle | H04L 63/145 |
| 2005/0114700 A1 * | 5/2005 | Barrie | H04L 63/0236 726/4 |
| 2005/0132417 A1 * | 6/2005 | Bobrovskiy | H04N 21/4332 725/134 |
| 2008/0143588 A1 * | 6/2008 | Alford | G01S 7/064 342/26 R |
| 2008/0263659 A1 * | 10/2008 | Alme | G06F 21/56 726/22 |
| 2009/0293125 A1 * | 11/2009 | Szor | G06F 21/56 726/24 |
| 2009/0299966 A1 * | 12/2009 | Schneider | G06F 17/30327 |
| 2011/0219450 A1 * | 9/2011 | McDougal | G06F 21/56 726/23 |
| 2013/0091571 A1 * | 4/2013 | Lu | G06F 21/563 726/23 |
| 2013/0145471 A1 * | 6/2013 | Richard | G06F 21/562 726/24 |
| 2017/0104784 A1 * | 4/2017 | Stemm | H04L 63/1483 |

* cited by examiner

*Primary Examiner* — Michael S McNally
(74) *Attorney, Agent, or Firm* — Husch Blackwell LLP

(57) ABSTRACT

Systems and methods analyze input files to automatically determine malware signatures. A set of input files known to contain a particular type of malware can be provided to a file analyzer. The file analyzer can analyze the file using a sliding window to create vectors from values that are provided by multiple filters that process each window. The vectors created for a file define a response matrix. The response matrices for a set of input files can be analyzed by a classifier to determine useful vector components that can define a signature for the malware.

29 Claims, 6 Drawing Sheets

120

FILTER

| WINDOW | | 1 | 2 | ... | M |
|---|---|---|---|---|---|
| | 1 | 123456 | 1.2 | ... | 4563974 |
| | 2 | 56789 | 0.39 | | 36954 |
| | 3 | 0 | 2.83 | ... | 1964 |
| | 4 | 5972 | 1.119 | ... | 6987 |
| | ⋮ | ⋮ | ⋮ | | ⋮ |
| | N | 35687 | 4.8 | ... | 61894 |

202   204

FIG. 2

DETECTION OF MALWARE IN DERIVED PATTERN SPACE

CROSS-REFERENCE TO RELATED APPLICATIONS

This Application claims priority to U.S. Provisional Patent Application Ser. No. 62/222,634, filed on Sep. 23, 2015, to Libor Mořkovský, entitled "Detection of Malware in Derived Pattern Space," the entire disclosure of which is incorporated herein by reference.

FIELD

The disclosure relates generally to detecting malware in files, and more particularly, to detecting malware in a derived pattern space of a set of files.

BACKGROUND

Malware, short for "malicious software," is software that can be used to disrupt computer operations, damage data, gather sensitive information, or gain access to private computer systems without the user's knowledge or consent. Examples of such malware include software viruses, trojan horses, rootkits, ransomware etc. A common mechanism used by malware developers is to embed the malware into a file that is made to appear desirable to user, or is downloaded and executed when the user visits a web site. For example, malware may be embedded into a software application that appears legitimate and useful. The user downloads the file, and when the file is opened, the malware within the file is executed.

In the face of the growing threat of malware, many anti-malware software packages were developed to detect malware in a user's files. Upon detection, the anti-malware software may notify the user of the presence of the malware, and may automatically remove or quarantine the malware. Conventional anti-malware software is based on detecting a signature of the malware in a file. A signature is a distinctive pattern of bytes in the malware that identifies the software as potential malware.

In order to avoid detection by anti-malware software, sophisticated malware developers introduced polymorphism into their malware. Polymorphic malware refers to malware in which portions of the malware are automatically changed without changing the overall functioning of the malware. As a result of the polymorphic behavior, the malware does not have a consistent signature and is thus less likely to be detected by anti-malware software.

BRIEF SUMMARY OF THE INVENTION

Systems and methods for detecting malware in a derived pattern space include classifying malware by receiving a file in a file analyzer. The file analyzer iteratively analyzes the file. During an iterative analysis, the file analyzer applies at least one filter to a portion of the file at a position within the file indicated by a position indicator. The one or more filters provide a set of one or more numeric filter results. In an embodiment of the invention, there is a single numeric filer result per one filter. The one or more sets of numeric filter results are added to at least one response matrix. In particular, when a file and a set of filters are used, the results are added to a response matrix. When a plurality of files and a set of filters are used, the result is a list of response matrices. Machine learning is enabled on top of the response matrice(s). An offset is added to the position indicator to establish a position for the next iteration of analysis.

Adding the results to the response matrix enables learning a signature for malware. In particular, adding one or more numeric filter results to the response matrix includes producing a set of response matrices for labeled files and a set of response matrices for clean files. A classifier creates a signature based on the vectors in the response matrices created by the plurality of filters.

BRIEF DESCRIPTION OF THE DRAWINGS

For a better understanding of the inventive subject matter, reference may be made to the accompanying drawings in which:

FIG. 2 illustrates an example response matrix used for detecting malware.

DETAILED DESCRIPTION

Figure 1:
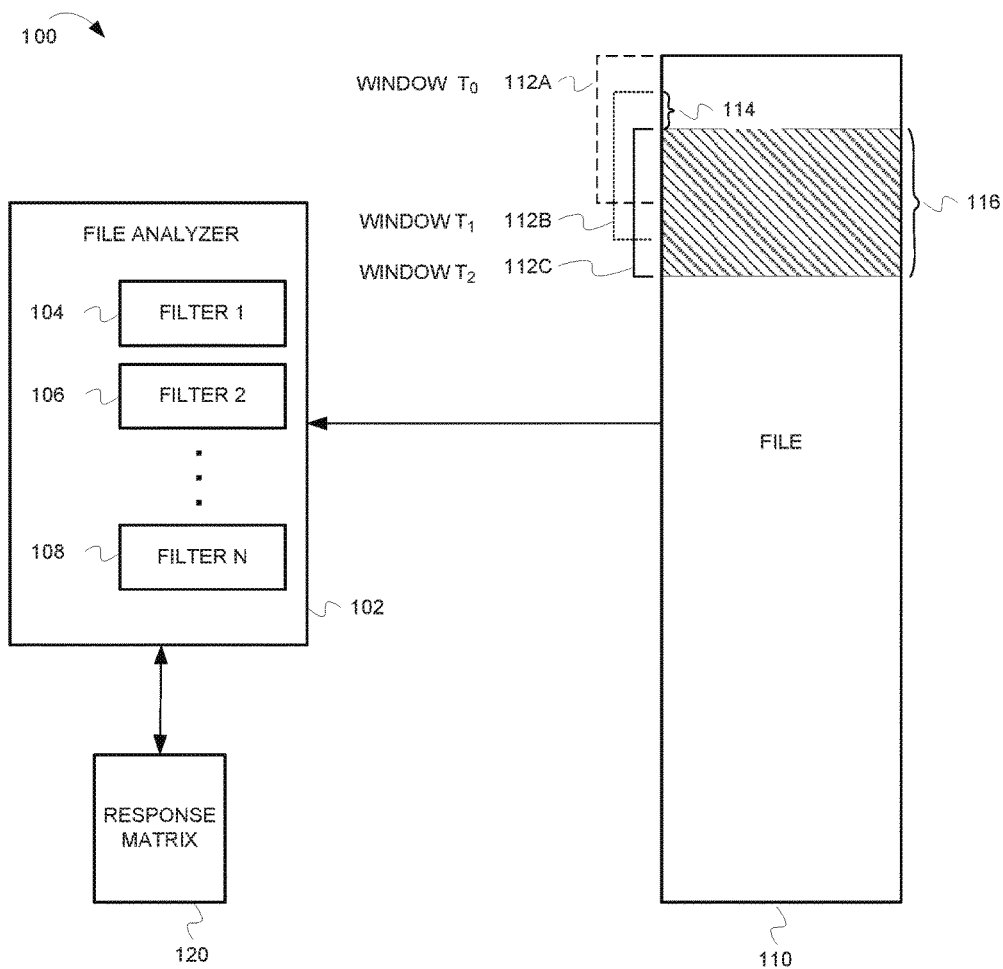
FIG. 1 is a block diagram of illustrating components of an operating environment of a file analyzer for creating a response matrix.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram of illustrating components of an operating environment 100 of a file analyzer 102 for creating a response matrix. In some embodiments, operating environment 100 includes a file analyzer 102 that analyzes a file 110 to produce a response matrix 120. File 110 can be any type of file that may include malware. Examples of such files include native executable files, document files that can execute macros or scripts, or files that can contain embedded hyperlinks to web sites containing malware.

File analyzer 102 includes one or more filters (e.g., filters 104, 106 and 108) that process a portion of the file (referred to as a file window) and return a numeric value based on the processing. In the example illustrated in FIG. 1, three filters, filter 104, filter 106 and filter 108 are present. Filter 104 can be a convolution filter. For example, filter 104 may calculate a sum of the byte values of the data in the file window. The resulting sum can be returned as the filter value. Other types of convolution operations are possible and within the scope of the inventive subject matter.

Filter 106 can be an entropy filter that performs an entropy calculation on the file portion. In one aspect, an entropy calculation can be performed by taking a fixed number of bytes (e.g., the window size), counting the frequency of each byte value in the window and then processing the frequencies with a Shannon information entropy formula: negative sum of the products of relative value frequency with 2-based log of the relative value frequency with 2-based log of the relative value frequency. Other methods of performing an entropy calculation are possible and within the scope of the inventive subject matter.

Filter 108 can perform disassembly scoring on the file portion. One example of disassembly scoring can be counting the number of subroutine calls in an x86 assembly. In some embodiments, the assembly byte code can be read from a particular offset to locate a start of an assembly. In alternative embodiments, other properties of the code can be checked to determine an x86 assembly—e.g., an x86 call is often encoded by 0xE8 byte followed by a little endian double word (i.e., 4 bytes) containing the relative offset. The destination encoded by 4 bytes following each 0xE8 byte can be compared with the size of the current code section, and if it fits, the 0xE8 byte can be interpreted as a call instruction. In another example, a disassembler can be executed on the window data, and count of the number of errors that were reported can be used as a disassembly score.

In some embodiments, file analyzer 102 reads file 110 and applies the filters 104, 106 and 108 to a window defining a portion of the file. The window start can be defined by a position indicator. The window size 116 can be fixed during the operation of the file analyzer 102. The window size 116 can be predetermined or configured, for example by configuration data in a file, registry data or data supplied via a command line. The window size 116 can be chosen based on a sensitivity/specificity tradeoff. A smaller window size (e.g., tens to low hundreds bytes) may be chosen to provide high specificity. A larger window size (e.g., hundreds to low thousands bytes) may be chosen to provide higher sensitivity. The file analyzer starts at the beginning of the file (i.e., position indicator=0) and applies the filters to the portion of the file defined by the window position indicator and the window size. The results of the filters can be added to a response matrix 120.

The file analyzer 102 adds a striding offset 114 to the current position indicator for the file, thereby defining a window position into the file. The file analyzer 102 then applies the filters to the portion of the file defined new window position and window size 116. The results of the filters for the new window position can be added to the response matrix 120.

The file analyzer 102 continues to iteratively process the file. At each iteration, the file analyzer 102 applies the filters to the portion of the file defined by the current window position and window size 116, adds the results of the filters to the response matrix 120, and advances the current window position by adding the striding offset 114 to the current window position. The file analyzer completes processing when the file window reaches the end of the file.

In some embodiments, the striding offset can be less than the window size. In such cases, a window can overlap its neighbor windows. Thus, some of the same byte values (i.e., byte values in overlapping portions) may be used for calculation of the filter responses of several neighboring windows.

Windows 112A, 112B and 112C into file 110 illustrate an example where the striding offset 114 is less than the window size 116. Window 112A is a window that is used when the file analyzer 102 begins processing a file (time t=0). The filters 104, 106 and 108 are applied to the byte values in the portion of file 110 defined by window 112A. For the next iteration (time t=1), the window 112B is defined by advancing the current window position by the striding offset 114. Similarly, for the next iteration (time t=3), the window 112C is defined by adding the striding offset 114 to the current file position. As can be seen from the figure, there is an overlap between windows 112A, 112B and 112C such that some of the same values in the file are used during successive application of the filters to the windows.

The striding offset 114 can be a predetermined or configured value. A striding offset of "1" (one) can result in the highest sensitivity of the file analyzer 102, but also uses more processing time and results in a larger response matrix 120. The choice of a striding offset value can be based on a desired sensitivity, the number of files 110 to process, the available computing resources, and a desired execution time.

The example file analyzer illustrated in FIG. 1 includes three filters. Those of skill in the art having the benefit of the disclosure will appreciate that a file analyzer may have fewer or more filters. Further, the various combinations of filter types are possible and within the scope of the inventive subject matter.

FIG. 2 illustrates an example response matrix 120 for a file. The dimensions of the response matrix 120 are defined by the number of filters and the number of windows that were processed for the file, which is determined by the size of the file, the size of the window, and the striding offset. In the example illustrated in FIG. 2, there response matrix has "m" filters and "n" windows. Each column in the matrix is a vector of values produced by a single filter for each of the windows of the file. For example, column 202 may be a vector produced by filter 104, column 204 may be a vector produced by filter 106 etc.

Figure 3:
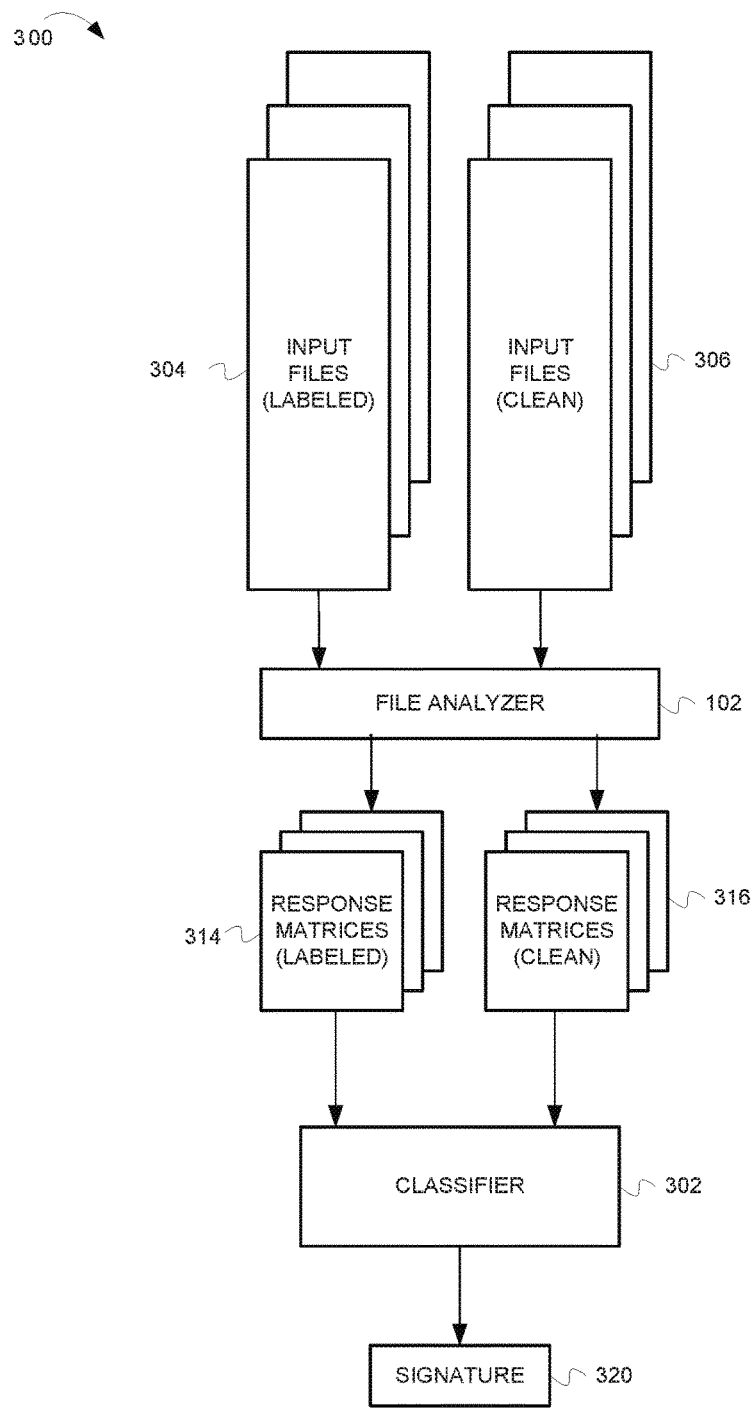
FIG. 3 is a block diagram of illustrating components of a system for learning a signature for malware based on a derived pattern space according to embodiments.

FIG. 3 is a block diagram of illustrating components of a system 300 for learning a signature for malware based on a derived pattern space according to embodiments. In some embodiments, system 300 includes a file analyzer 102 and a classifier 302. File analyzer 102, can analyze labeled input files 304 and clean input files 306 as described above to produce a set of response matrices 314 for the labeled input files and a set of response matrices 316 for the clean input files. Labeled input files 304 comprise files that are known to include a particular type of malware, where the type of malware is identified by a label. Each file in the set of labeled input files 304 is known to contain an instance of the type of malware. However, there may be variations in each instance of the malware when the malware is polymorphic malware. Clean input files 106 are known to be free of malware.

Classifier 302 receives the response matrices produced by file analyzer 102 and its associated filters. Classifier 302 can analyze the response matrices and can create a signature 320 based on vectors in the response matrices 314 created by the filters of file analyzer 102. The classifier 302 can 'learn' a model that allows it to determine either clean/malware labels, or labels discriminating several classes of malware. In some aspects, the model can be realized by determining a part of the response matrix (row and column wise, mathematically it can be described as producing weight matrix of the same size as the filter matrix, with many zeroes and spatially correlated positive values), which can be considered a signature 320. The second set of response matrices 316 may be tested against set of response matrices 314 to determine if there is any cross-reactivity present.

Figure 4:
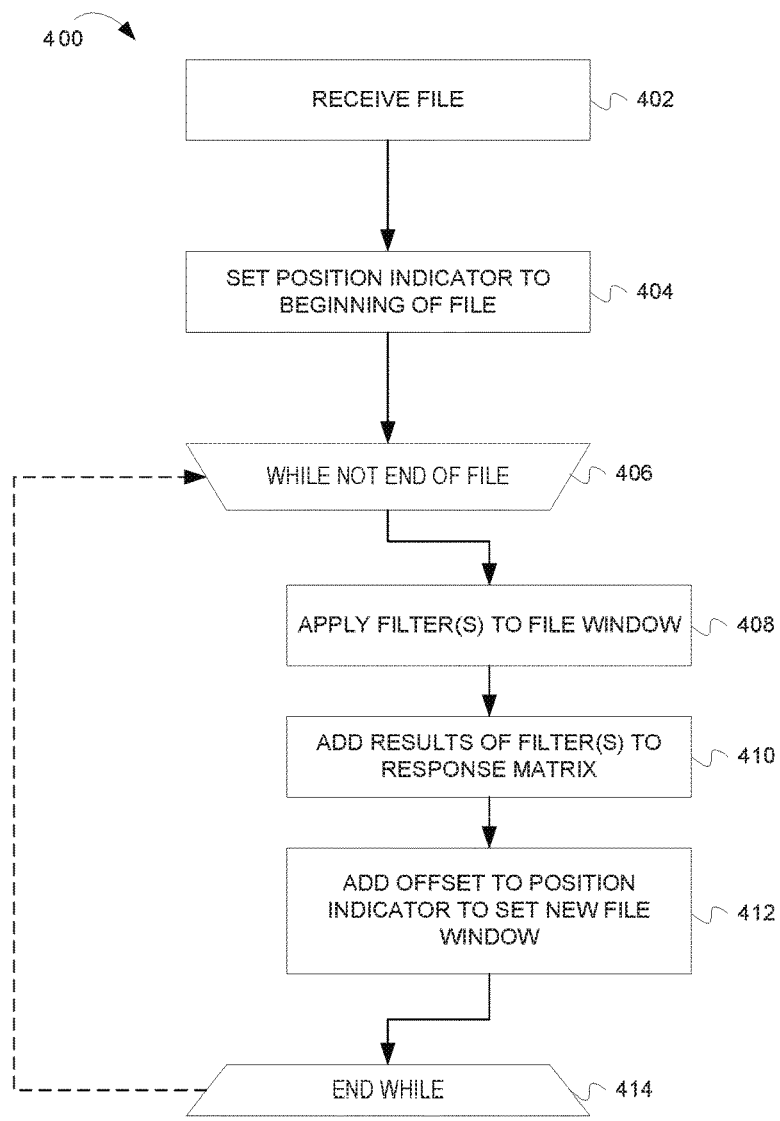
FIG. 4 is a flow chart illustrating operations of a method for creating a response matrix according to embodiments.
Figure 5:
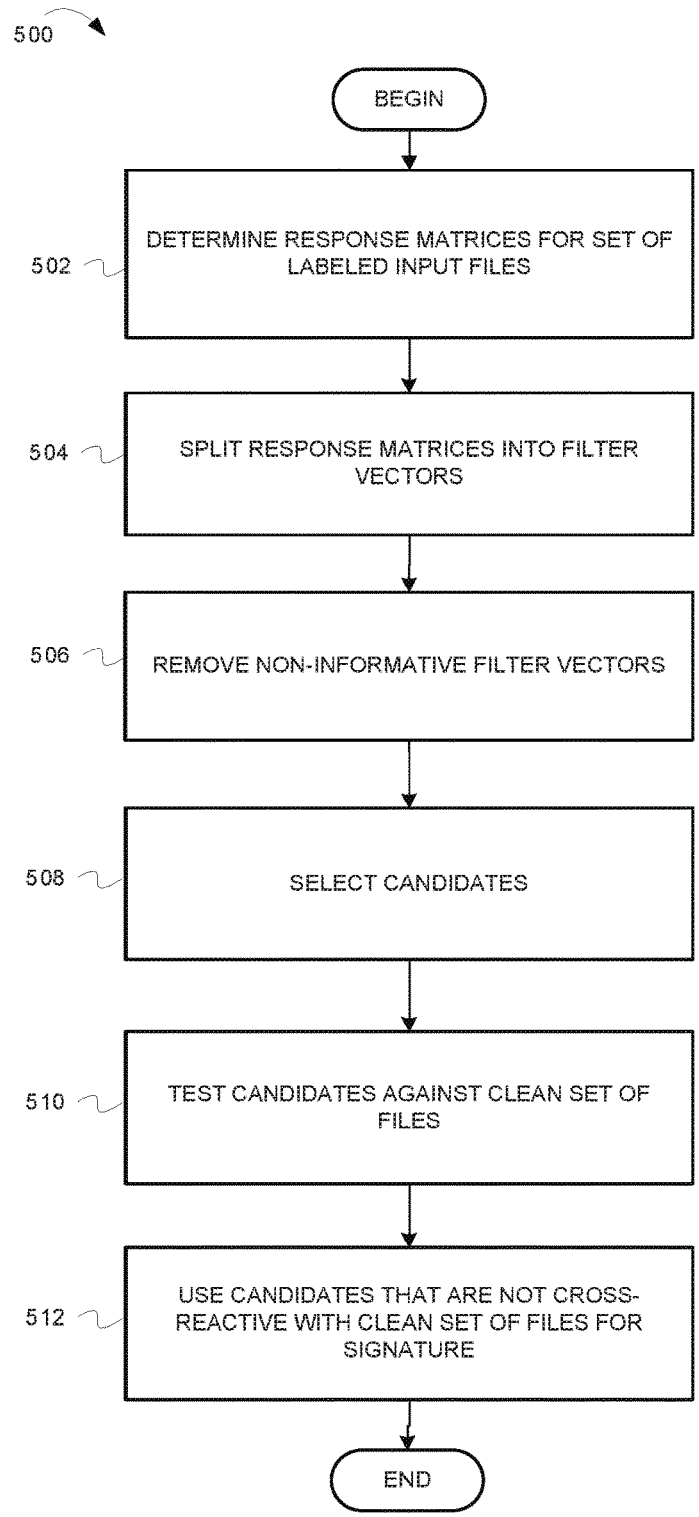
FIG. 5 is a flow chart illustrating operations of a method for creating a malware signature according to embodiments.

Further details on the operation of file analyzer 102 and classifier 302 will now be provided with reference to FIGS. 4 and 5.

FIG. 4 is a flow chart 400 illustrating operations of a method for creating a response matrix 120 according to embodiments. At block 402 a file analyzer receives a file. As noted above, the file can be any type of file that can contain malware.

At block 404, a position indicator that indicates the starting position of a window into the file data is initialized to the beginning of the file (e.g., a position of "0" (zero) within the file).

Block 406 is the top of a loop that iteratively processes the file, with operations of blocks 408-412 being performed for each iteration of the loop.

At block 408, one or more filters are applied to the file. As discussed above, various types of filters may be applied to the file. Each filter returns a numeric value as the result of the filter's processing of the file. As noted above, a filter can range from performing simple convolutions on the window such as summing the byte values within the window, to nonlinear response filters that perform entropy calculations on the data within the file window, to very complex filters such as filters that perform disassembly scoring on the data within the file window.

At block 410, the numerical results of the processing performed by the filters are added to a response matrix.

At block 412, the window is repositioned by adding a striding offset to the current position indicator to modify the current position indicator to point to the start of the next window to be processed in the file.

At block 414, processing returns to block 406 if the file window has not reached the end of the file.

FIG. 5 is a flow chart 500 illustrating operations of a method for creating a malware signature according to embodiments.

At block 502, a classifier, using a file analyzer and filters as described above, determines a set of response matrices for a set of labeled input files. The labeled input files are files that are known to contain a particular type of malware, where the type is identified by a label.

At block 504, the classifier splits the response matrices into filter vectors, where there is one vector per filter per response matrix.

At block 506, the filter vectors are analyzed, and non-informative filter vectors are removed. In some aspects, the filter vectors are split into ngrams (i.e., a subvector of length n) using a process similar to splitting the file into windows. The ngrams may have a striding offset of 1, and n may be determined by the algorithm used to find the neighbors. In embodiments, n is within a range of 28-32. In an embodiment, n is at or near 30, a number for n at which the algorithm performs well. Accordingly, for example, assume n as 30. Then for an input filter vector of length N, there will be N−30+1 ngrams for a particular filter vector. Any ngrams that are considered non-informative can be removed. For instance, ngrams that have a very low norm or a very high norm can be considered non-informative and can be removed. A matching structure for efficient search of nearest neighbor ngrams may be created from the remaining ngrams. In some aspects a single matching structure can be created for each column using all available samples in order to determine ngrams that appear in more than one sample. It is not necessary that the ngram appear verbatim, but rather ngrams that are within a Euclidian distance may be considered similar enough. In some aspects, a kd-tree algorithm with Euclidean distance is used to determine nearest neighbor ngrams. However, the embodiments are not limited to any particular technique. For example, in some aspects, locally sensitive hashing may be used.

At block 508, candidate ngrams are selected. The candidate ngrams can be selected by an "all-to-all" query. In other words, filter vectors from all sample files are considered to determine if similar ngrams appear in the filter vectors across multiple sample input files having the same known malware. The ngrams that are in the results set of the query can be sorted by the distance that it takes to cover a sufficient number of input files. For example, the matching structure of ngrams for a column can contain all samples from the set of input files. For a given ngram, the structure can be searched for other ngrams that are within some Euclidian distance of the given ngram. The ngrams can be sorted by the number of "hits" (i.e., number of ngrams within the threshold Euclidean distance). The ngrams that have a high number of hits can be used as part of the signature 320. In some aspects, the threshold can be gradually increased which can result in covering more distinct samples. However, the is a balance between specificity and sensitivity, and if the threshold is increased too much, more false positives may be detected for a candidate ngram. In some aspects, the threshold distance can be stored with the signature.

At block 510, the candidates are then tested against a clean set of files. Filter vectors and ngrams are generated for the clean set of files in the same manner as described above for the labeled set of files. A nearest neighbor matching structure can also be created as described above to generate signatures up to the stored distance thresholds. The testing can determine cross-reactivity of the candidates with respect to the clean set of files.

At block 512, if the candidates are not cross reactive, then the candidate ngrams and the associated distance threshold can be used to generate a signature for the labeled malware.

It should be noted that the above-described systems and methods can be used to learn a multi-label classification. In this case, the method illustrated in FIG. 5 is executed, replacing the labeled files with multi-labeled files, and replacing the clean set of files with a set of files having a set of labeled malware. Cross-reactive patterns are then discarded.

Figure 6:
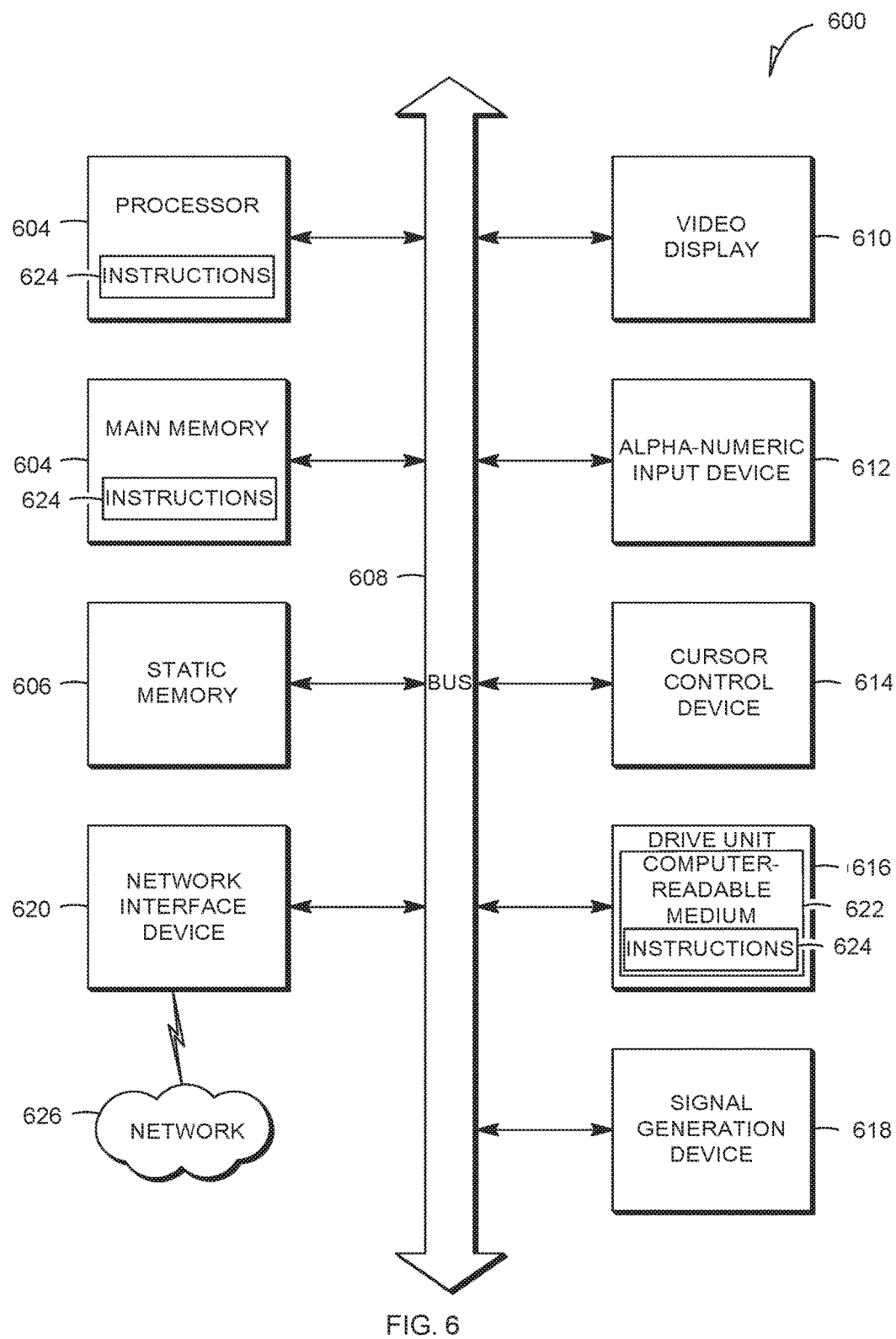
FIG. 6 is a block diagram of an example embodiment of a computer system upon which embodiments of the inventive subject matter can execute.

FIG. 6 is a block diagram of an example embodiment of a computer system 600 upon which embodiments of the inventive subject matter can execute. The description of FIG. 6 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 6 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 6, an example embodiment extends to a machine in the example form of a computer system 600 within which instructions for causing the machine to perform any one or more of the methodologies discussed herein may be executed. In alternative example embodiments, the machine operates as a standalone device or may be connected (e.g., networked) to other machines In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alpha-numeric input device 612 (e.g., a keyboard), a user interface (UI) navigation device or cursor control device 614 (e.g., a mouse), a disk drive unit 616, a signal generation device 618 (e.g., a speaker), and a network interface device 620.

The disk drive unit 616 includes a machine-readable medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 624 may further be transmitted or received over a communications network 626 using a signal transmission medium via the network interface device 620 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method of producing response matrices for labeled and clean files that enable generation of models for classifying malware in other files, the method comprising:
   receiving, by a file analyzer, a plurality of files, wherein at least one file of the plurality of files is a labeled file that comprises a file that is known to include a particular type of malware, wherein the type of malware is identified by a label, and wherein at least another file of the plurality of files is a clean file that comprises a file that is known to be free of malware; and
   iteratively processing each file of the plurality of files, wherein, during each iteration, the file analyzer performs operations comprising:
      applying at least one filter to a portion of the file at a position within the file indicated by a position indicator, wherein the one or more filters provide a set of one or more numeric filter results,
      adding the set of one or more numeric filter results to a response matrix, wherein said adding the set of one or more numeric filter results to the response matrix comprises producing at least one response matrix for the at least one labeled file and at least one response matrix for the at least one clean file, and
      adding an offset to the position indicator.

2. The method of claim 1, wherein said applying at least one filter comprises applying a plurality of filters to said portion of the file at a position within the file indicated by a position indicator.

3. The method of claim 2, wherein said applying a plurality of filters comprises applying a convolution filter.

4. The method of claim 3, wherein said portion of the file comprises a file window having a window start position defined by the position indicator, wherein said applying a convolution filter comprises calculating a sum of byte values in said file window and using said sum as a filter value.

5. The method of claim 2, wherein said applying a plurality of filters comprises applying an entropy filter.

6. The method of claim 5, wherein said portion of the file comprises a file window having a window start position defined by the position indicator, wherein said applying an entropy filter comprises applying an entropy filter that performs an entropy calculation by taking a fixed number of bytes corresponding to the number of bytes in the file window, counting a frequency of each byte value in the file window, and processing said frequencies with an information entropy formula.

7. The method of claim 6, wherein said processing said frequencies with an information entropy formula comprises processing said frequencies with a Shannon information entity formula.

8. The method of claim 2, wherein said applying a plurality of filters comprises applying a filter that performs disassembly scoring on a portion of the file.

9. The method of claim 1, said method further comprising continuing to iteratively process the file and, at each iteration of a plurality of iterations, the file analyzer (i) applies a plurality of filters to the file defined by a current position of a current file window that has a starting point at the position indicator and a window size, (ii) adds the results of the plurality of filters to the response matrix, and (iii) advances the current position of the file window to a new window position by adding the offset to the current window position.

10. The method of claim 1, wherein the offset is less than a window size of a file window corresponding to the file, wherein said file window has a window position, wherein a new window position to which the file window is advanced, from the window position which becomes a previous window position, overlaps the previous window position, thereby resulting in at least one value in the file being used during successive application of the plurality of filters to the windows.

11. The method of claim 1 further comprising choosing the offset based on at least one of a desired sensitivity, a number of files to process, an availability of computing resources, and a desired execution time.

12. The method of claim 1 further comprising generating the matrix to have dimensions that are defined by a number of filters and a number of file portions that were processed for the file.

13. The method of claim 12, wherein generating the matrix to have dimensions that are defined by a number of filters and a number of file portions that were processed for the file further uses a size of the file, a size of the file portions, and the offset.

14. The method of claim 13, wherein said applying at least one filter comprises applying a plurality of filters and wherein said generating said matrix comprises generating the matrix to have a vector of values produced by a one of the plurality of filters for each of the file portions of the file.

15. The method of claim 1, said method further comprising learning a signature for malware based on vectors in the at least one response matrix for the at least one labeled file and the at least one response matrix for the at least one clean file.

16. The method of claim 1, wherein applying at least one filter to a portion of the file comprises applying a plurality of filters and wherein said response matrices comprise vectors created such that there is one vector per filter per response matrix, said method further comprising creating, in a classifier, a signature based on the vectors in the response matrices created by the plurality of filters.

17. The method of claim 16, wherein the classifier identifies a model that allows the classifier to determine at least one of (i) clean and malware labels and (ii) labels discriminating several classes of malware.

18. The method of claim 17, the method further comprising realizing the model by determining a part of the response matrix by producing a weight matrix of the same size as the response matrix.

19. The method of claim 16 further comprising determining if a first set of response matrices and a second set of response matrices have any cross-reactivity present.

20. The method of claim 16 further comprising analyzing the vectors and removing non-informative filter vectors.

21. The method of claim 20 further comprising splitting the vectors into subvectors of length n (ngrams).

22. The method of claim 21 further comprising selecting candidate ngrams by determining if similar ngrams appear in the vectors across a plurality of files in a sample that have the same known malware.

23. The method of claim 22 further comprising sorting the ngrams by a number of ngrams within a threshold distance and using the sorted ngrams that have a selected number of occurrences within the threshold distance as part of the signature.

24. The method of claim 23 further comprising gradually increasing the threshold distance.

25. The method of claim 23 further comprising storing the threshold distance with the signature.

26. The method of claim 22 further comprising testing the candidates ngrams against a clean set of files to determine cross-reactivity of the candidate ngrams with respect to the clean set of files.

27. The method of claim 26 further comprising, when the candidate ngrams are not cross reactive, using the candidate ngrams and the distance threshold to generate the signature for the labeled malware.

28. The method of claim 27 further comprising indicating a plurality of labeled files and a plurality of clean files, identifying a multi-label classification, and replacing the labeled files with multi-labeled files and replacing the clean files with a set of files having a set of labeled malware.

29. The method of claim 28 further comprising discarding ngram patterns that exhibit cross-reactivity between differently labeled samples.

* * * * *